United States Patent [19]

Anders

[11] 4,202,633

[45] May 13, 1980

[54] MACHINE FOR PROCESSING PLASTICS MATERIALS

[75] Inventor: Dietmar Anders, Hanover, Fed. Rep. of Germany

[73] Assignee: Hermann Berstorff Maschinenbau GmbH, Hanover, Fed. Rep. of Germany

[21] Appl. No.: 938,716

[22] Filed: Nov. 3, 1978

[51] Int. Cl.² .......................... B29B 1/06; B01F 7/08
[52] U.S. Cl. .................................. 366/79; 366/318; 198/666
[58] Field of Search .................. 366/90, 89, 88, 79, 366/80, 81, 83, 84, 318, 321, 322, 323, 324, 329, 325, 326, 327, 319, 343, 82, 85; 425/207, 208, 209; 198/664, 666, 662

[56] References Cited

U.S. PATENT DOCUMENTS

| | | | |
|---|---|---|---|
| 1,101,142 | 6/1914 | Mueller | 366/81 |
| 1,484,945 | 2/1924 | Hill | 198/664 |
| 3,458,894 | 8/1969 | Wheeler | 366/90 |
| 3,814,563 | 6/1974 | Slaby | 366/90 |
| 3,884,451 | 5/1975 | Stenmark | 366/90 |

Primary Examiner—Harvey C. Hornsby
Attorney, Agent, or Firm—Schwartz, Jeffery, Schwaab, Mack, Blumenthal & Koch

[57] ABSTRACT

A machine for processing plastics materials having a screw mounted in a housing and made up of a plurality of screw members in the form of collars on a drive shaft, whereby screw members to suit a particular material treatment are secured against rotation on the drive shaft and can be exchanged when required for other screw members, the machine including a thrust arrangement to press the screw members axially into close engagement with one another, the thrust arrangement comprising a divided thrust ring axially supported on the drive shaft at least at one of the end zones thereof, thrust or draw bolts, which act on the adjacent end surface of the adjacent outermost one of the screw members or on a frontal surface of a guide ring bearing against the outermost one of the screw members, and a sleeve closely surrounding the periphery of the divided thrust ring.

9 Claims, 5 Drawing Figures

MACHINE FOR PROCESSING PLASTICS MATERIALS

The invention relates to a machine for processing plastics materials.

Such a machine may have a screw mounted in a housing and made up of a plurality of screw members in the form of collars or a drive shaft, whereby screw members to suit a particular material treatment are secured against rotation on the drive shaft and can be exchanged when required for other screw members.

The individual screw members of such a screw for processing the plastics material must be axially braced in relation to one another with sufficient force to ensure that the screw members lie close to one another even under rapid changes of temperature and when there are temperature differences between the drive shaft and the screw members.

Previously proposed continuously operating mixing apparatuses with two drive shafts positioned bilaterally in one housing have for the most part back feed screw members behind a discharge opening. In arrangements of this kind, the material pressure additionally attempts to force apart the screw members lying together.

The invention has among its objects axially to pre-stress and to hold together the interchangeable screw members on a drive shaft in a reliable way.

The invention provides an axially divided thrust ring arrangement supported by the drive shaft in at least one end zone of the inner surface of the housing, said thrust ring arrangement having draw-in or thrust bolts, which act against the frontal surface of the adjacent outermost screw member or a frontal surface of a guide ring resting against the screw members, and the axially divided thrust ring of the thrust ring arrangement is fittingly enclosed by a sleeve of fixed position.

The construction in accordance with the invention of the thrust arrangement for the screw members ensures that the prestressing forces are always great and can be applied to the shaft without high torques using small diameter bolts. The drive shafts may themselves act as pre-stressed springs. Even when there are large differences in temperature between the drive shaft and the screw members sufficient sealing against the penetration of melt is achieved.

In an advantageous embodiment of the invention the sleeve, which fittingly encloses the axially divided thrust ring, is a sleeve-shaped projection of the outermost screw member or of the guide ring.

To enable the axially divided thrust ring to be supported securely and simply it is preferably positioned in a recess in the drive shaft.

In another advantageous embodiment of the invention, the recess is at least twice as long axially as the divided thrust ring. In this way a simple assembly of the screw members is made possible because it is possible to displace the screw members axially in relation to the drive shaft. In a bilateral arrangement of the thrust arrangement with the divided thrust ring, the technical resources are kept low. Then only a reciprocal displacement of the screw members is necessary for the insertion of the thrust rings.

In another embodiment of the invention a plate spring assembly is disposed between the thrust bolts and the frontal surface of the adjacent outermost screw member or the frontal surface of a guide ring terminating the screw set. A further application of pre-stressing forces is hereby achieved.

The machine of the invention can have a plurality of cooperating screws.

The invention is diagrammatically illustrated by way of example in the accompanying drawings, in which.

Figure 1:
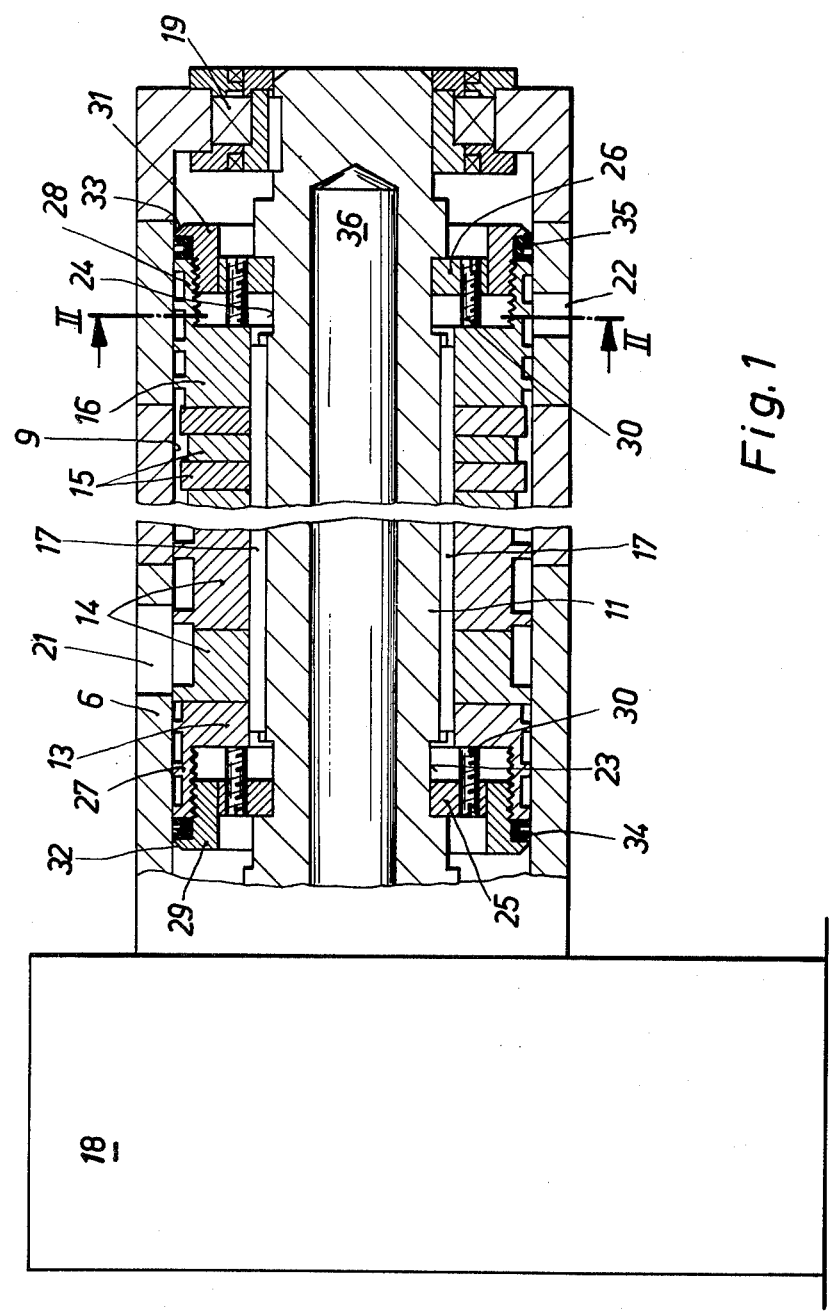
FIG. 1 shows a continuously operable machine according to the invention in the form of a mixing machine with two drive shafts positioned bilaterally in one housing, individual screw members being non-rotatably mounted on a respective drive shaft.
Figure 2:
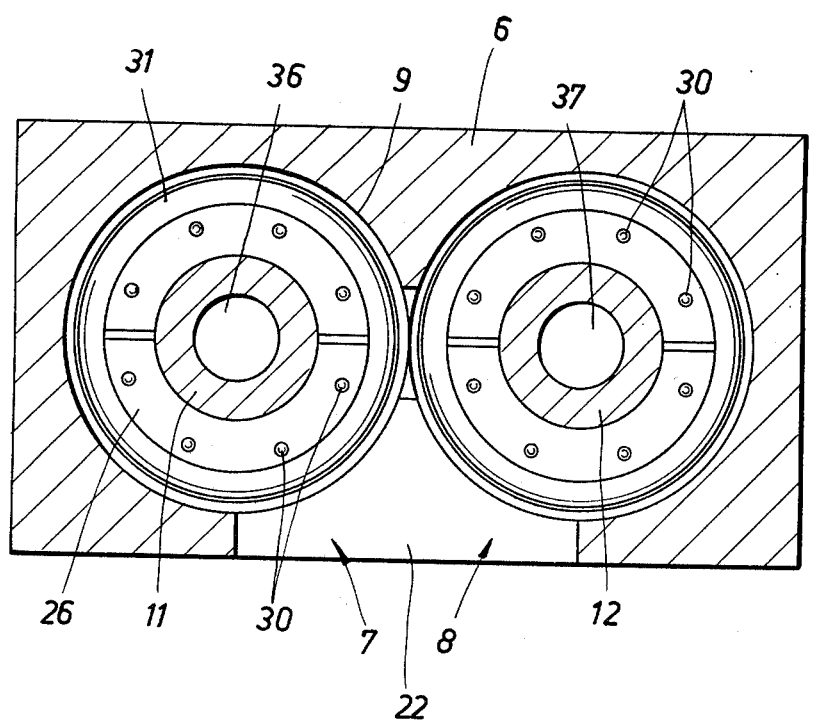
FIG. 2 shows a cross-section taken on line II—II of FIG. 1 and showing a divided thrust ring of a thrust arrangement axially compressing the screw members.

Referring to the drawings, in a housing 6 of the mixer illustrated in FIGS. 1 and 2, two rotors 7 and 8 are disposed parallel to one another in a twin bore 9. The rotors 7 and 8 comprise respective central drive shafts 11 and 12, upon which individual different screw members 13 to 16 are mounted. The drive shafts 11 and 12 each have two continuous keys 17 by means of which the screw members 13 to 16 are secured against rotation with respect to the respective drive shafts 11 and 12. The drive shafts 11 and 12 are caused to rotate by drive means 18. The drive shafts 11 and 12 are mounted at the drive end in a distributor gear unit and at the opposite discharge end in a removable radial bearing 19 in the housing 6. Material to be moulded can be supplied to the twin bore 9 of the mixer by way of a filling aperture 21. At the opposite end a discharge opening 22 is provided below the rotors 7 and 8.

The rotors 7 and 8 are of identical construction so the construction of the rotor 7 only is described.

The drive shaft 11 has adjacent each of its end zones a circumferential recess 23 or 24. Divided thrust rings 25 and 26 are engaged in these recesses 23 and 24. The thrust rings 25 and 26 each comprise two halves. However, it is possible to provide the divided thrust rings in three or more segments.

Thrust bolts 30 are screwed into the thrust rings 25 and 26, these bolts pressing against the axially outwardly facing surface of the adjacent outermost screw member 13 or 16. The screw members 13 and 16 each have a sleeve-like projection 27 and 28, into which internal threads have been cut. A sleeve 29 or 31 is screwed into this internal thread and has an internal diameter such that the sleeve 29 or 31 encloses the axially divided thrust ring 25 or 26 so as to fit the periphery of said thrust ring. A respective sealing ring 34 or 35 is inserted between an outwardly projecting flange 32 or 33 on the sleeve 29 or 31 and the outermost screw member 13 or 16. Said covering reaching with its one end to the upper edge of the intake opening.

The tapped recesses 23 and 24 in the end zones of the drive shaft 11 each have an axial length twice the axially length of the divided thrust ring 25 or 26. The drive shafts 11 and 12 have central tempering bores 36 or 37.

In order to exchange the screw members 13 to 16 for other screw members, the housing 6 is removed. The thrust bolts 30 of the thrust rings 25 and 26 are retracted completely. The entire set of screw members 13 to 16 is displaced towards the drive means 18 until the member 13 abuts the divided thrust ring 25. The sleeve 31 is then removed. The divided thrust ring 26 can now be removed from the recess 24 in a simple manner. The screw members 13 to 16 can now be exchanged for others. When the new screw members have been mounted the axially divided thrust ring 26 is inserted into the recess 24 again and the sleeve 31 is screwed into the sleeve like projection 28 of the screw member 16 so that the sleeve 31 fittingly encloses the outer periphery of the divided thrust ring 26. The entire set of screw members is then displaced again into its middle position and the thrust bolts 30 are advanced towards the adjacent screw members 13 to 16 again. By supporting the divided thrust rings 25 and 26 in the recesses 23 and 24, pre-stressing forces on the screw members are absorbed by the drive shaft 11. When the housing 6 has been re-fitted the mixing machine is once more ready for operation.

Figure 3:
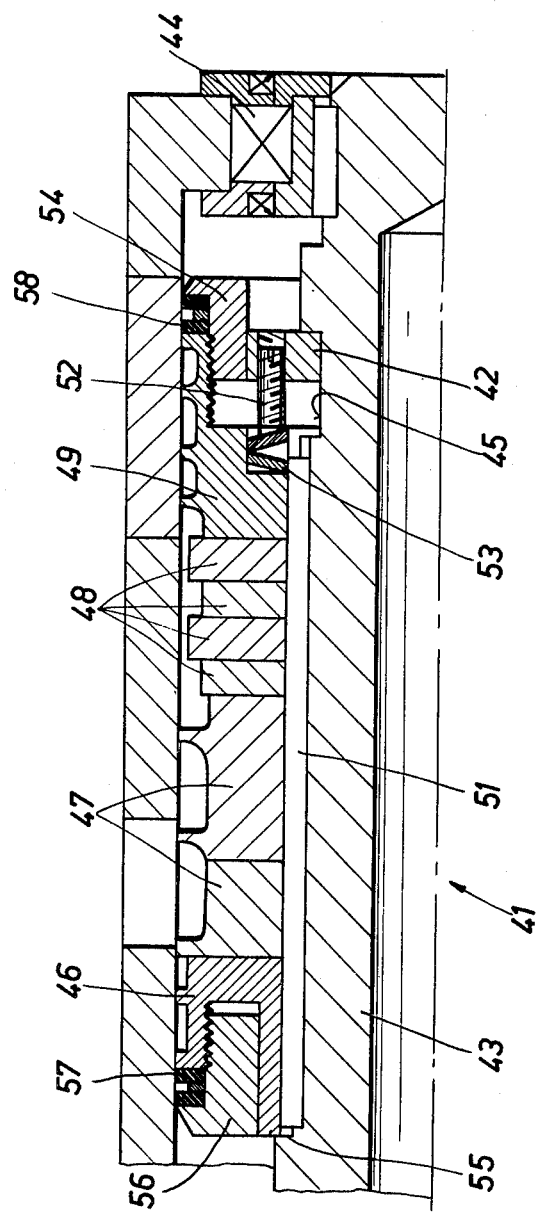
FIG. 3 shows a section from a continuously operable machine according to the invention in the form of a mixing machine with double-sided positioning of the drive shafts, wherein a thrust arrangement with a divided thrust ring is only provided at one end.

In the modified embodiment shown sectionally in FIG. 3 a mixing rotor 41 has only one tensioning device with a divided thrust ring 42. A circumferential recess 45 is provided adjacent a support bearing 44 in the end zone on a drive shaft 43, the divided thrust ring 42 being inserted into the recess 45. Screw members 46 to 49 are non-rotatably mounted on the drive shaft 43 by way of a key 51. The divided thrust ring 42 bears thrust bolts 52, which act against an outermost screw member 49 by way of a plate spring assembly 53. The axially divided thrust ring 42 is closely enclosed over its periphery by a sleeve 54 screwed into the outermost screw member 49.

At the other end of the screw set 46 to 49, the screw member 46 abuts a shoulder 55 on the drive shaft 43. A seal 57 is located by a screwed-in end ring 56 and the screw member 46. The sleeve 54 and the screw member 49 enclose a further seal 58.

In this embodiment the divided thrust ring 42 preferably comprises three ring segments.

Figure 4:
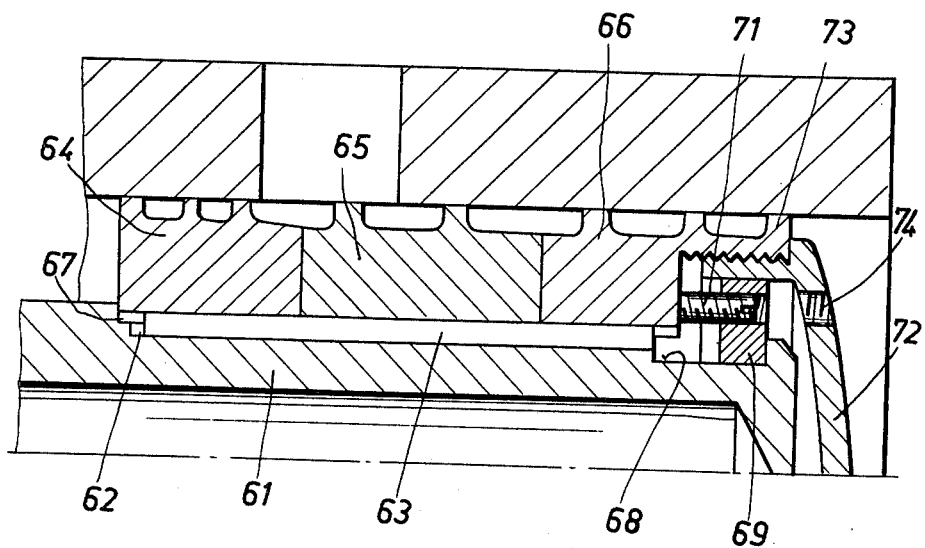
FIG. 4 shows a machine according to the invention with a one-ended positioning of a drive shaft and a one-ended thrust arrangement.

In the embodiment of FIG. 4, a drive shaft 61 has a key 63 disposed in an axially extending groove 62. Screw members 64 to 66 are non-rotatably mounted on the drive shaft 61, the outermost drive end screw member 64 abutting a shoulder 67 of the shaft 61. At the opposite end the drive shaft 61 has a tapped recess 68 into which a divided thrust ring 69 is inserted. The divided thrust ring 69 has thrust bolts 71 which act against the outer end surface of the adjacent screw member 66. The divided thrust ring 69 is secured peripherally by a cap ring 72 which is screwed into an annular projection 73 of the outermost screw member 66. The cap ring 72 has apertures 74 therein through which a tool can be passed to rotate the thrust bolts 71. Screw caps (not shown) can be screwed into the apertures 74 for sealing purposes.

Figure 5:
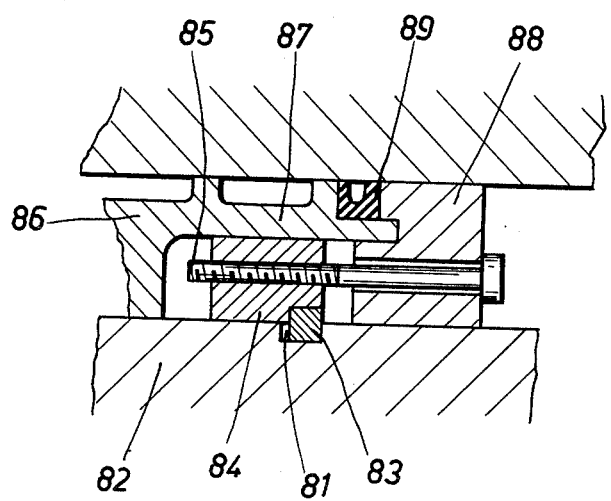
FIG. 5 shows a sectional view of another embodiment of a thrust arrangement for a screw machine according to the invention axially compressing the screw members.

The embodiment of the tensioning device illustrated in FIG. 5 shows a snap ring 83 of square cross-section inserted in a recess 81 in a drive shaft 82. A divided thrust ring 84 is supported by the inserted snap ring 83, draw-in bolts 85 being screwed into the divided thrust ring 84 to pull the thrust ring 84 towards the snap ring 83. A sleeve-like projection 87 on an outermost screw member 86 encloses the divided thrust ring 84 and thus secures said thrust ring peripherally. The draw-in bolts 85 extend through a guide ring 88, which is thereby pressed against the end surface of the sleeve-like projection 87 of the screw member 86 while securing a seal 89.

A modified embodiment of the tensioning device illustrated in FIG. 5 has the snap ring 83 replaced by a divided ring which forms the thrust ring, an undivided further ring is supported by this divided ring, the undivided ring gripping over the divided thrust ring by way of a recess. Draw-in bolts are screwed into the further ring and passed through the guide ring thereby pressing the guide ring against the outermost screw member.

What is claimed is:

1. A machine for processing plastics materials having a screw mounted in a housing and made up of a plurality of screw members in the form of collars on a drive shaft, whereby screw members to suit a particular material treatment are secured against rotation on said drive shaft and can be exchanged when required for other screw members, the machine including a thrust arrangement to press the screw members axially into close engagement with one another, the thrust arrangement comprising a divided thrust ring axially supported on said drive shaft at one of the end zones thereof, thrust bolts which act on the adjacent end surface of the adjacent outermost one of said screw members and a sleeve closely surrounding the periphery of said divided thrust ring.

2. A machine as claimed in claim 1, wherein said sleeve is an annular projection from the adjacent outermost screw member.

3. A machine as claimed in claim 1, wherein said divided thrust ring is located in a circumferentially extending recess in said drive shaft.

4. A machine as claimed in claim 3, wherein said recess in said drive shaft has an axial length at least twice the axial dimension of said divided thrust ring.

5. A machine as claimed in claim 1, including a plate spring assembly disposed between said thrust bolts and said adjacent end surface of the adjacent outermost one of said screw members.

6. A machine as claimed in claim 1, including a snap ring located in a recess in said drive shaft, said snap ring axially supporting said divided thrust ring.

7. A machine as claimed in claim 1, having a plurality of co-operating screws.

8. A machine for processing plastics materials having a screw mounted in a housing and made up of a plurality of screw members in the form of collars on a drive shaft, whereby screw members to suit a particular material treatment are secured against rotation on said drive shaft and can be exchanged when required for other screw members, the machine including a thrust arrangement to press the screw members axially into close engagement with one another, the thrust arrangement comprising a divided thrust ring axially supported on said drive shaft at one of the end zones thereof, draw bolts which act on a frontal surface of a guide ring bearing against the outermost one of the screw members, and a sleeve closely surrounding the periphery of the divided thrust ring.

9. A machine as claimed in claim 8, including in which said divided thrust ring is located in a circumferentially extending recess in said drive shaft, said sleeve closely surrounding the periphery of said divided thrust ring is on a ring in which said draw bolts are engaged and said draw bolts extend through said guide ring which bears against the adjacent end surface of the outermost one of said screw members.

* * * * *